July 17, 1923.

W. E. COPITHORN

TIRE VALVE

Filed July 15, 1920

1,462,227

Inventor:
Walter E. Copithorn,
by Heard Smith & Tennant
Atty's.

Patented July 17, 1923.

1,462,227

UNITED STATES PATENT OFFICE.

WALTER E. COPITHORN, OF NATICK, MASSACHUSETTS.

TIRE VALVE.

Application filed July 15, 1920. Serial No. 396,381.

*To all whom it may concern:*

Be it known that I, WALTER E. COPITHORN, a citizen of the United States, residing at Natick, county of Essex, State of Massachusetts, have invented an Improvement in Tire Valves, of which the following description, in connection with the accompanying drawing, is a specification, like characters on the drawing representing like parts.

This invention relates to valves for pneumatic tires and particularly to that type of valve which is provided with means for positively clamping it to the seat. The object of the invention is to provide an improved valve of this type which is simple in its construction; which can be easily manipulated, and which has other features, all as will be more fully hereinafter set forth.

In order to give an understanding of my invention, I have illustrated in the drawings some selected embodiments of the invention which will now be described, after which the novel features will be pointed out in the appended claim.

In the drawings, Fig. 1 is a longitudinal sectional view through a valve embodying my invention;

Figure 3:
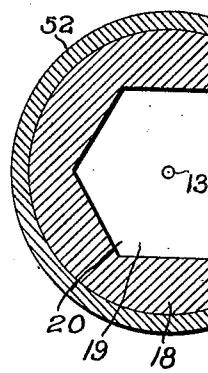
Fig. 3 is an enlarged section on the line 3—3, Fig. 1.
Figure 1:
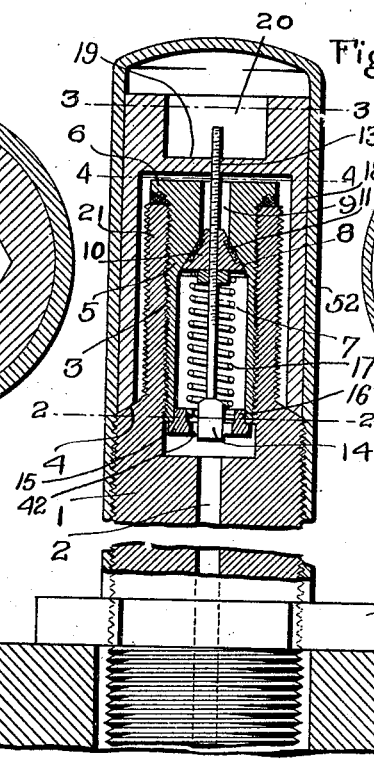
Figure 2:
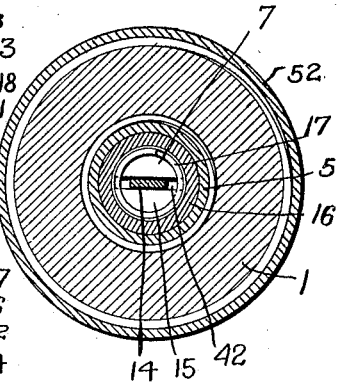
Fig. 2 is an enlarged section on the line 2—2, Fig. 1.

My invention can be applied to the ordinary valve stem or may be embodied in a valve structure having a specially-constructed valve stem. In Figs. 1 to 3, I have shown it as it might be applied to the valve stem constructed to receive the ordinary Schrader valve.

1 indicates the valve stem which is provided with the duct or bore 2 and which has at its outer end the internally screw-threaded recess or bore 3 in which the valve is usually received. This valve stem is also provided with the reduced externally screw-threaded end 21 which is adapted to receive the pump connection and with an external shoulder 4.

Figure 4:
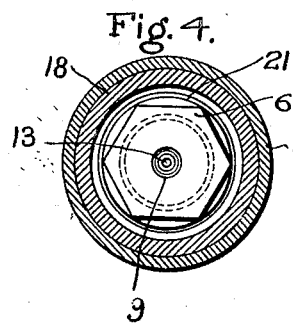
Fig. 4 is a section on the line 4—4, Fig. 1.

My improved valve comprises a valve casing 5 which is constructed to screw into the screw-threaded bore 3 and is formed at its end with a head 6 arranged to engage the end of the valve stem 1. This head 6 is preferably non-circular in shape, as shown in Fig. 4, so that a wrench or suitable implement may be applied thereto for removing the valve casing or inserting it into place.

The underside of the head 6 is provided with a facing 41 of soft metal or some other suitable packing for the purpose of making a tight joint with the end of the valve stem when the valve casing is screwed firmly into place. This valve casing is provided with an interior valve chamber 7, with a conical valve seat 8 at one end of the chamber, and with a duct 9. The valve is shown at 10, and it has a conical shape to fit the valve seat 9, and the conical portion thereof will preferably be provided with an insert 11 of soft metal which engages the valve seat 8 and makes a tight joint therewith. This valve is shown as mounted on a central rod or support 12, one end 13 of which is screw-threaded and extends through the bore 9 and beyond the valve casing 6 when the valve is seated. This supporting rod 12 extends below the valve 10 and the end 14 thereof is flattened and occupies a slot 42 formed in a cap piece 15 which is secured to the end of the valve casing 5. This cap piece 15 is shown as having the circular flange 16 which fits the interior of the casing with a tight fit and is thus frictionally held in place. 17 is a spring encircling the supporting rod 12 and confined between the cap 15 and the valve, said spring yieldingly holding the valve to its seat.

18 is a cap which is adapted to embrace the end of the valve stem and to rest against the shoulder 4 thereof. This cap has a bridge piece 19 provided with a screw-threaded aperture of a size to fit the screw-threaded portion 13 of the supporting rod. The cap is also formed in its outer end with a recess 20 having a shape to fit the head 6 of the valve casing, thus enabling the cap to be used as a wrench for removing the valve casing or inserting it in place. When the cap 18 is removed the tire may be pumped up in usual way by attaching the pump connection to the portion 21 of the valve stem. When the tire is properly inflated, then the cap 18 is placed over the end of the valve stem and is screwed to the end 13 of the valve rod. When the end of the cap engages the shoulder 4, then any further turning movement of said cap will draw the valve tightly to the seat 8 and thus make a perfectly tight non-leaking joint. During this operation the valve is prevented from turning by the flattened end 14 which is received in a slot formed in the cap 15. When the cap 18 is removed, then the recess 20 thereof constitutes a wrench for removing the valve casing 5 or inserting it in place.

Figure 6:
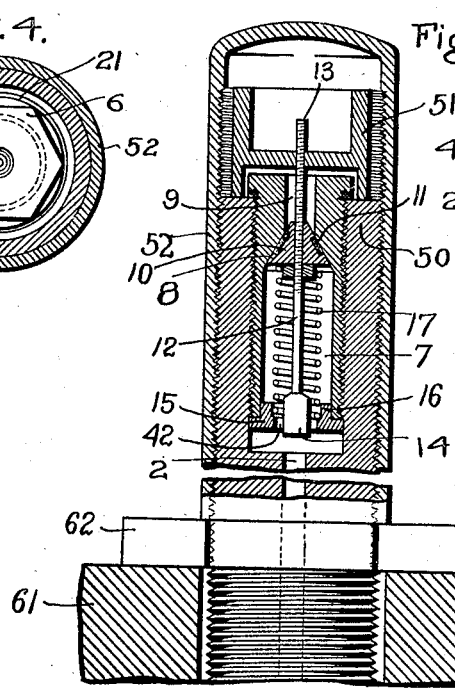
Fig. 6 is a modification of the invention.
Figure 5:
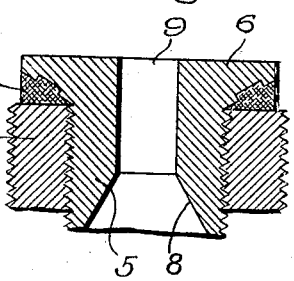
Fig. 5 is an enlarged sectional view through the valve chamber and valve stem showing the manner in which a tight joint is made.

In Fig. 6 I have shown an embodiment of the invention wherein the valve is applied to a valve stem 50 of special construction, said valve stem being of substantially uniform diameter throughout. In this embodiment the bore 3 for receiving the valve casing can be larger than is possible in the construction shown in Fig. 1. This enables a larger valve to be used which has the advantage that the tire can be more rapidly pumped up than where the valve is a relatively small one. With the construction shown in Fig. 6 a special pump connection would have to be employed because of the increased size of the screw-threaded end of the valve stem to which the pump is attached.

In the construction shown in Fig. 6 the nut element 51 which is screw-threaded to the end 13 of the valve rod is shaped so that it rests against the end of the valve stem 50 instead of against a shoulder 4, as shown in Fig. 1. In other respects, the invention shown in Fig. 6 is similar to that shown in Fig. 1.

52 indicates a dust cap which may be screw-threaded to the valve stem to enclose the valve structure as usual in devices of this sort.

61 indicates a portion of the felly of a wheel which is equipped with a pneumatic tire having my improved valve and 62 is the usual lock nut which is screw threaded to the valve stem and engages the inside of the wheel felly.

I claim:

In a tire valve, the combination with a valve stem having an interiorly screw-threaded bore and an external shoulder, of a valve casing screw-threaded into said bore and provided with a conical valve seat, said casing having a non-circular head which fits against the end of the valve stem, a spring-pressed valve within the casing engaging said seat, said valve having a screw-threaded rod or projection extending therefrom through and beyond the casing, and a cap adapted to seat against the shoulder of the valve stem and having screw-threaded engagement with said projection, whereby when the cap is turned the valve will be firmly forced against its seat, said cap having a recess to fit the non-circular end of the casing and thus constituting a wrench for removing the casing from the valve stem.

In testimony whereof I have signed my name to this specification.

Dr. WALTER E. COPITHORN.